US012658962B2

(12) United States Patent
Wu et al.

(10) Patent No.: US 12,658,962 B2
(45) Date of Patent: Jun. 16, 2026

(54) WEARABLE DEVICE AND COMMUNICATION METHOD THEREOF

(71) Applicant: HTC Corporation, Taoyuan City (TW)

(72) Inventors: Chun-Yih Wu, Taoyuan City (TW);
Ta-Chun Pu, Taoyuan City (TW);
Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 292 days.

(21) Appl. No.: 18/470,694

(22) Filed: Sep. 20, 2023

(65) Prior Publication Data

US 2025/0047316 A1     Feb. 6, 2025

(30) Foreign Application Priority Data

Aug. 2, 2023     (TW) .................................. 112129097

(51) Int. Cl.
*H04B 1/3827* (2015.01)
*H04B 1/40* (2015.01)

(52) U.S. Cl.
CPC ............... *H04B 1/385* (2013.01); *H04B 1/40* (2013.01); *H04B 2001/3861* (2013.01)

(58) Field of Classification Search
CPC ... H04B 1/385; H04B 1/40; H04B 2001/3861

USPC .......................................................... 455/73
See application file for complete search history.

(56) References Cited

U.S. PATENT DOCUMENTS

| | | | |
|---|---|---|---|
| 10,895,634 B2 * | 1/2021 | Nath .................... | H01Q 21/064 |
| 2013/0141271 A1 * | 6/2013 | Mobius ................. | H01Q 13/28 |
| | | | 342/175 |
| 2021/0050650 A1 * | 2/2021 | Chiu .................... | H01Q 1/2283 |
| 2022/0303990 A1 * | 9/2022 | Juneja ............... | H04W 52/0209 |

FOREIGN PATENT DOCUMENTS

| | | |
|---|---|---|
| CN | 112117538 B | 12/2021 |
| CN | 112952386 B | 4/2023 |

* cited by examiner

*Primary Examiner* — Eugene Yun
(74) *Attorney, Agent, or Firm* — Birch, Stewart, Kolasch & Birch, LLP

(57) ABSTRACT

A wearable device includes a carrier element, a wearable element, a SIP (System-In-Package) IC (Integrated Circuit), a first antenna element, and a second antenna element. The wearable element is connected to the carrier element. The SIP IC includes a first transceiver and a second transceiver. The SIP IC is disposed on the carrier element. The first antenna element is coupled to the first transceiver. The first antenna element is integrated with the SIP IC. The second antenna element is coupled to the second transceiver. The second antenna element is integrated with the carrier element.

19 Claims, 5 Drawing Sheets

<u>100</u>

200

400

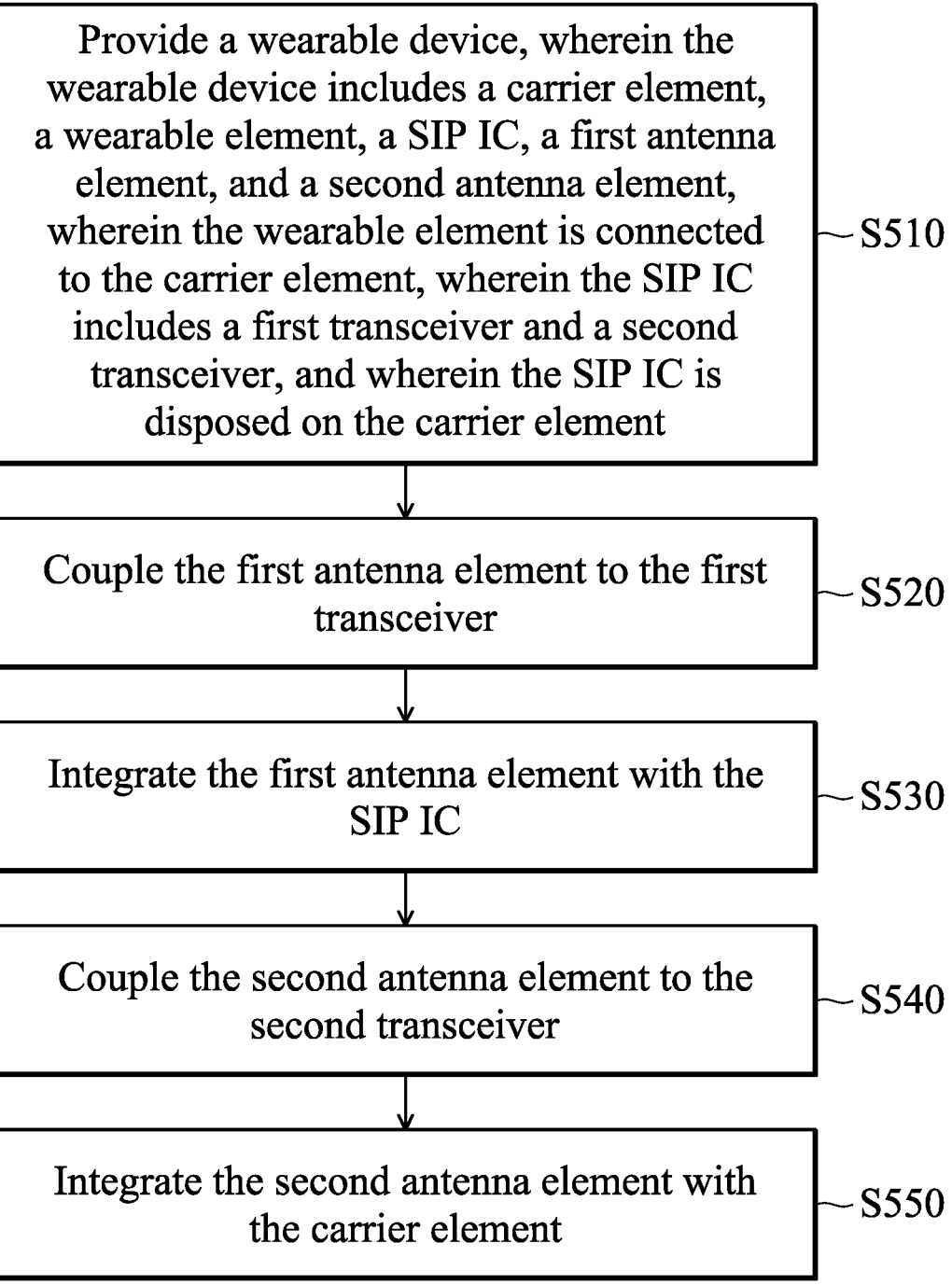

Provide a wearable device, wherein the wearable device includes a carrier element, a wearable element, a SIP IC, a first antenna element, and a second antenna element, wherein the wearable element is connected to the carrier element, wherein the SIP IC includes a first transceiver and a second transceiver, and wherein the SIP IC is disposed on the carrier element — S510

Couple the first antenna element to the first transceiver — S520

Integrate the first antenna element with the SIP IC — S530

Couple the second antenna element to the second transceiver — S540

Integrate the second antenna element with the carrier element — S550

FIG. 5

WEARABLE DEVICE AND COMMUNICATION METHOD THEREOF

CROSS REFERENCE TO RELATED APPLICATIONS

This application claims priority of Taiwan Patent Application No. 112129097 filed on Aug. 2, 2023, the entirety of which is incorporated by reference herein.

BACKGROUND OF THE INVENTION

Field of the Invention

The invention relates to a wearable device, and more particularly, to a wearable device with a communication function.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Researchers predict that the next generation of mobile devices will be "wearable devices". For example, wireless communication may be applied to watches, glasses, and even clothes in the future. However, the internal space of some wearable devices is very limited, and it cannot accommodate antennas for wireless communication. Accordingly, there is a need to propose a novel solution for solving the problems of the prior art.

SUMMARY OF THE INVENTION

In an exemplary embodiment, the invention is directed to a wearable device that includes a carrier element, a wearable element, a SIP (System-In-Package) IC (Integrated Circuit), a first antenna element, and a second antenna element. The wearable element is connected to the carrier element. The SIP IC includes a first transceiver and a second transceiver. The SIP IC is disposed on the carrier element. The first antenna element is coupled to the first transceiver. The first antenna element is integrated with the SIP IC. The second antenna element is coupled to the second transceiver. The second antenna element is integrated with the carrier element.

In some embodiments, the wearable device is a smart ring with a communication function.

In some embodiments, the carrier element is a ring platform element.

In some embodiments, the carrier element is made of a metal material.

In some embodiments, the wearable element is a ring support element.

In some embodiments, the wearable element is made of a metal material or a non-metal material.

In some embodiments, the SIP IC is implemented with a multilayer circuit board.

In some embodiments, the first antenna element covers a first frequency band, and the first frequency band is from 60 GHz to 500 GHz.

In some embodiments, the first antenna element includes an antenna array disposed on the top of the SIP IC.

In some embodiments, the second antenna element covers a second frequency band, and the second frequency band is from 300 GHz to 500 GHz.

In some embodiments, the second antenna element includes a radar waveguide array formed in the carrier element.

In some embodiments, the radar waveguide array includes a plurality of waveguides which are substantially parallel with each other.

In some embodiments, the distance between any two adjacent waveguides is from 0.5 to 0.8 wavelength of the second frequency band.

In some embodiments, the SIP IC further includes a processor.

In some embodiments, the second antenna element receives a sense signal. The processor generates a notification signal according to the sense signal. The first antenna element transmits the notification signal outwardly.

In some embodiments, the SIP IC further includes a third transceiver.

In some embodiments, the wearable device further includes a third antenna element coupled to the third transceiver. The third antenna element is integrated with the wearable element.

In some embodiments, the third antenna element covers an NFC (Near Field Communication) frequency band.

In some embodiments, the third antenna element includes a radiation coil disposed in the wearable element.

In another exemplary embodiment, the invention is directed to a communication method includes the steps of: providing a wearable device, wherein the wearable device includes a carrier element, a wearable element, a SIP IC, a first antenna element, and a second antenna element, wherein the wearable element is connected to the carrier element, wherein the SIP IC includes a first transceiver and a second transceiver, and wherein the SIP IC is disposed on the carrier element; coupling the first antenna element to the first transceiver; integrating the first antenna element with the SIP IC; coupling the second antenna element to the second transceiver; and integrating the second antenna element with the carrier element.

DESCRIPTION OF DRAWINGS

The invention can be more fully understood by reading the subsequent detailed description and examples with references made to the accompanying drawings, wherein:

FIG. 5 is a flowchart of a communication method according to an embodiment of the invention.

DETAILED DESCRIPTION OF THE INVENTION

Figure 1:
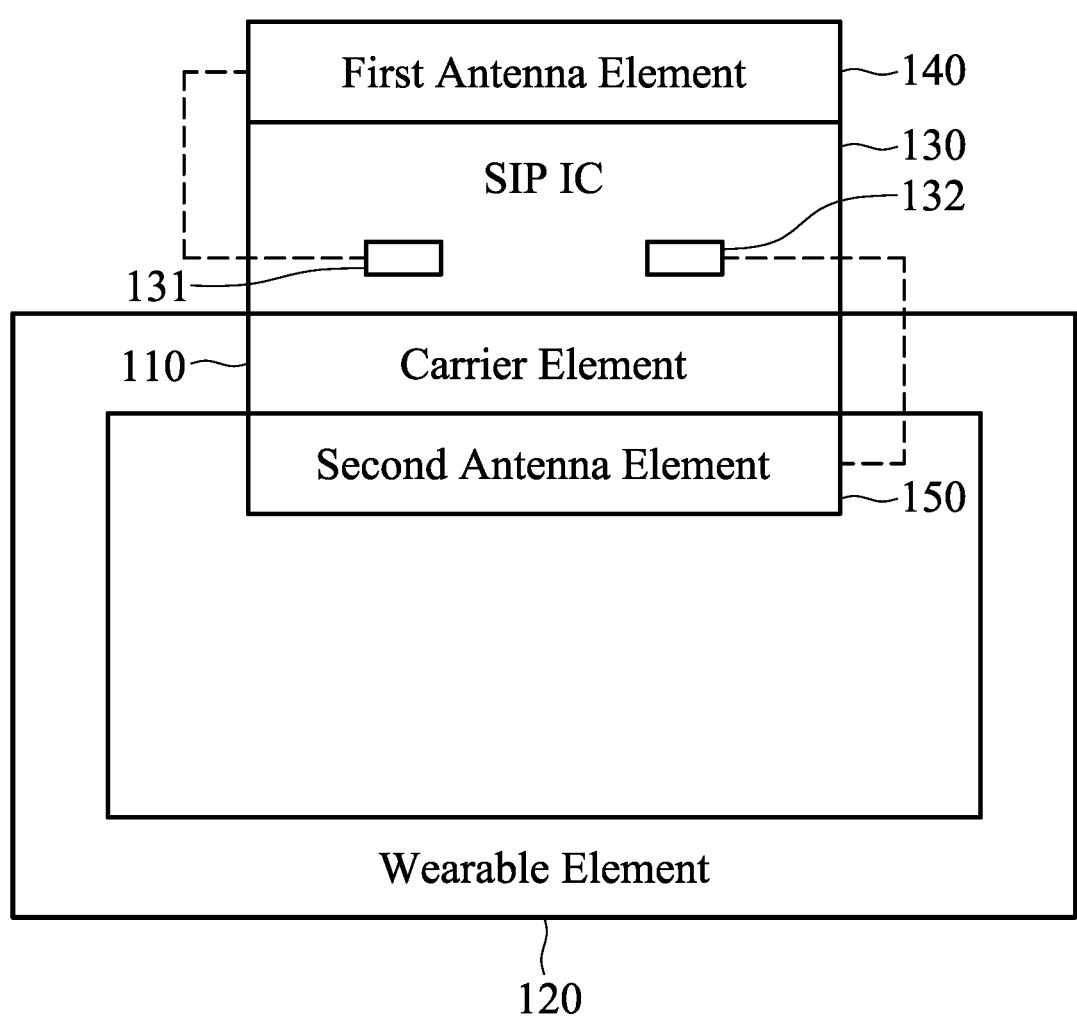
FIG. 1 is a diagram of a wearable device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a wearable device 100 according to an embodiment of the invention. The type of the wearable device 100 is not limited in the invention. For example, wearable device 100 may be a ring device or a bracelet device with a communication function. In the embodiment of FIG. 1, the wearable device 100 includes a carrier element 110, a wearable element 120, a SIP (System-In-Package) IC (Integrated Circuit) 130, a first antenna element 140, and a second antenna element 150. It should be understood that the wearable device 100 may further include other components, such as a housing, a speaker, and/or a power supply module, although they are not displayed in FIG. 1.

The shapes of the carrier element 110 and the wearable element 120 are not limited in the invention. The carrier element 110 may be made of a metal material. The wearable element 120 may be made of a metal material or a non-metal material. The wearable element 120 is connected to the carrier element 110. Thus, the carrier element 110 can be fixed to a body portion of a user by using the wearable element 120.

The SIP IC 130 is disposed on the carrier element 110. The SIP IC 130 includes a first transceiver 131 and a second transceiver 132. In some embodiments, the first transceiver 131 is considered as a first signal source, and the second transceiver 132 is considered as a second signal source, but they are not limited thereto.

The first antenna element 140 is coupled to the first transceiver 131. The first antenna element 140 is integrated with the SIP IC 130. The second antenna element 150 is coupled to the second transceiver 132. The second antenna element 150 is integrated with the carrier element 110. The shape and types of the first antenna element 140 and the second antenna element 150 are not limited in the invention. For example, any of the first antenna element 140 and the second antenna element 150 may be a monopole antenna, a dipole antenna, a loop antenna, a helical antenna, a patch antenna, a PIFA (Planar Inverted F Antenna), or a chip antenna.

With such a design, the proposed wearable device 100 of the invention can use both the first antenna element 140 and the second antenna element 150 for wireless within its limited internal space. Therefore, the proposed wearable device 100 of the invention not only minimizes the device size but also improves the communication quality.

The following embodiments will introduce different configurations and detail structural features of the wearable device 100. It should be understood that these figures and descriptions are merely exemplary, rather than limitations of the invention.

Figure 2:
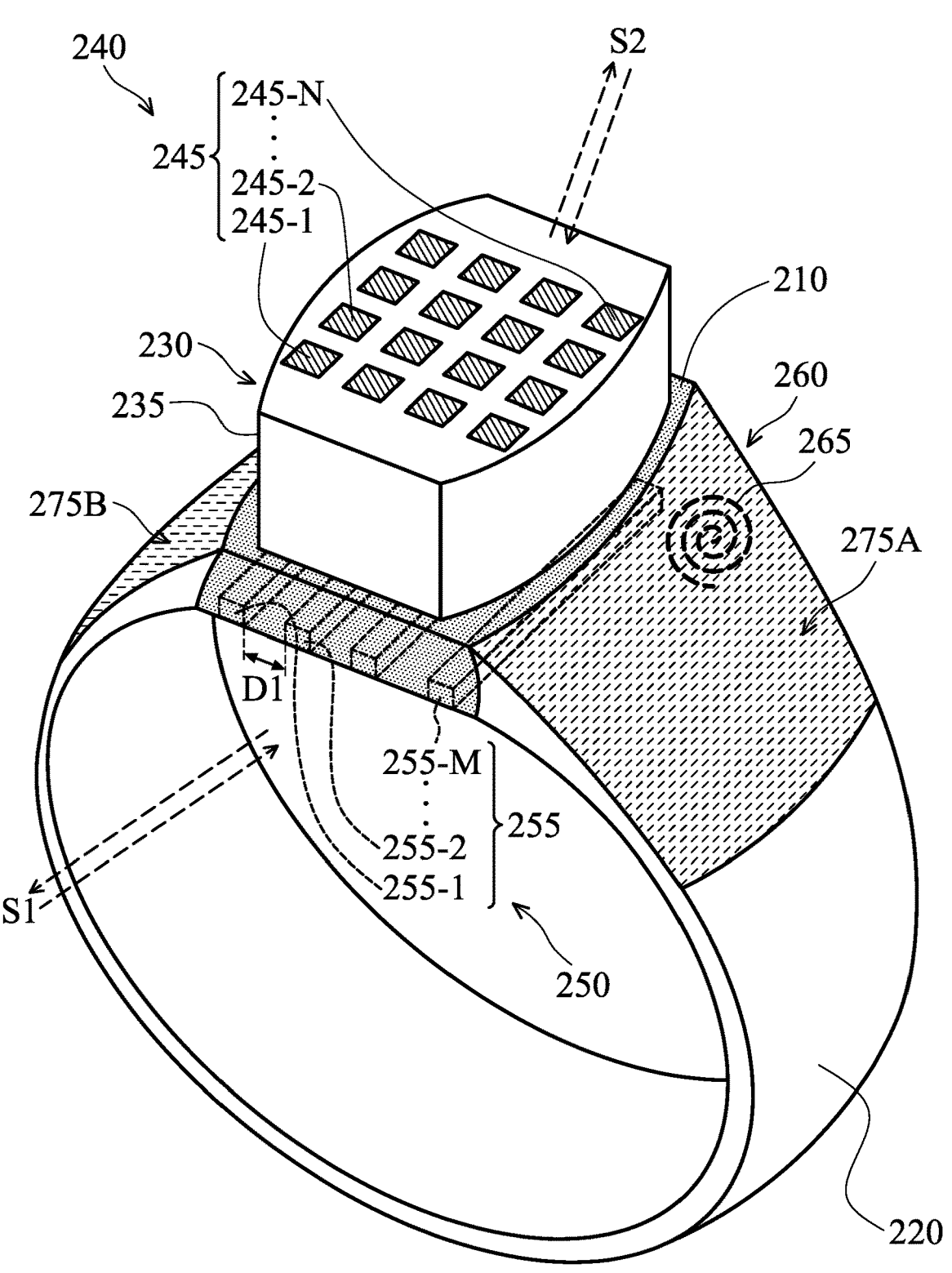
FIG. 2 is a perspective view of a wearable device according to an embodiment of the invention.
Figure 3:
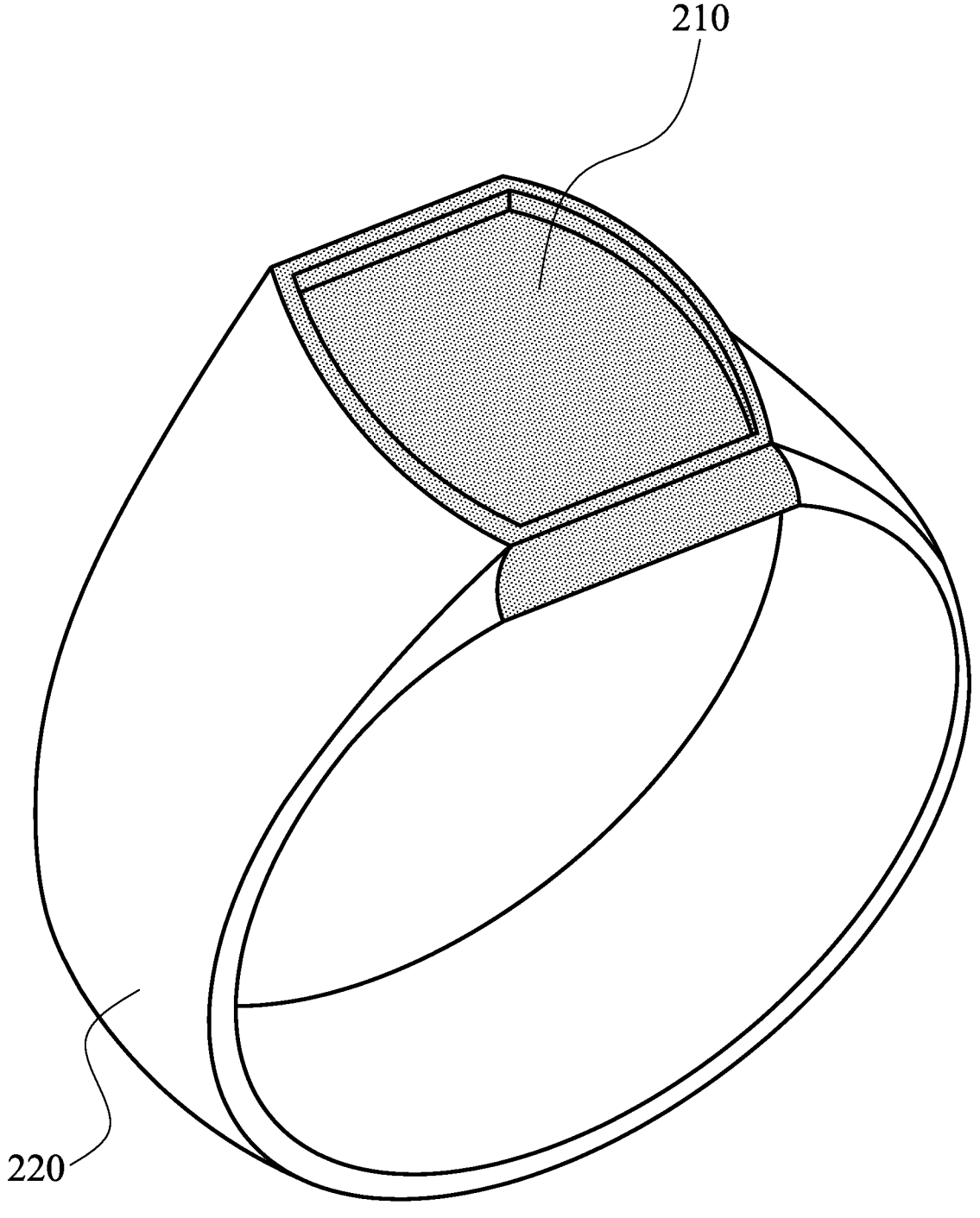
FIG. 3 is a perspective view of a wearable device according to an embodiment of the invention.

FIG. 2 is a perspective view of a wearable device 200 according to an embodiment of the invention. FIG. 2 is similar to FIG. 1. In the embodiment of FIG. 2, the wearable device 200 includes a carrier element 210, a wearable element 220, a SIP IC 230, a first antenna element 240, and a second antenna element 250. FIG. 3 is a perspective view of the wearable device 200 according to an embodiment of the invention (from another observation view). To simplify the figure, there are merely the carrier element 210 and the wearable element 220 displayed in FIG. 3, and the other components are all omitted. Please refer to FIG. 2 and FIG. 3 together.

The wearable device 200 may be a smart ring with a communication function.

For example, the carrier element 210 may be a ring platform element, which may be made of a metal material, and the wearable element 220 may be a ring support element, which may be made of a non-metal material. The wearable element 220 is connected to the carrier element 210. Thus, the carrier element 210 can be fixed onto a finger of a user by using the wearable element 220.

The SIP IC 230 may be implemented with a multilayer circuit board 235. For example, the multilayer circuit board 235 may include ten circuit layers, and the thickness of each circuit layer may be about 100 μm (which is adjustable according to the type and packaging technology of SIP), but it is not limited thereto. Also, the SIP IC 230 is disposed on the carrier element 210. The SIP IC 230 includes a first transceiver and a second (not shown).

The first antenna element 240 is coupled to the first transceiver of the SIP IC 230. The first antenna element 240 can cover a first frequency band. For example, the first frequency band may be from 60 GHz to 500 GHz, such that the first antenna element 240 can support the wideband operation of mmWave (Millimeter Wave).

In some embodiments, the first antenna element 240 includes an antenna array 245. The antenna array 245 may be disposed on the top of the SIP IC 230. The bottom of the SIP IC 230 may directly touch the carrier element 210. Specifically, the antenna array 245 includes a plurality of antenna units 245-1, 245-2, . . . , and 245-N, where "N" is any positive integer greater than or equal to 2. For example, the antenna units 245-1, 245-2, . . . , and 245-N may be arranged to form a square shape, and "N" may be a perfect square number, but it is not limited thereto.

The second antenna element 250 is coupled to the second transceiver of the SIP IC 230. The second antenna element 250 can cover a second frequency band. For example, the second frequency band may be from 300 GHz to 500 GHz, such that the second antenna element 250 can also support the wideband operation of mm Wave.

In some embodiments, the second antenna element 250 includes a radar waveguide array 255. The radar waveguide array 255 may be formed in the carrier element 210. Specifically, the radar waveguide array 255 includes a plurality of waveguides 255-1, 255-2, . . . , and 255-M which are substantially parallel with each other, where "M" is any positive integer greater than or equal to 2. For example, the distance D1 between any adjacent two of the waveguides 255-1, 255-2, . . . , and 255-M may be from 0.5 to 0.8 wavelength (0.5λ~0.8λ) of the second frequency band of the second antenna element 250. According to practical measurements, such a range of the distance D1 can help to reduce the mutual coupling between the waveguides 255-1, 255-2, . . . , and 255-M, and to suppress the side of the radiation pattern of the radar waveguide array 255.

In some embodiments, the second antenna element 250 is configured to transmit or receive a sense signal S1, and the first antenna element 240 is also configured to transmit or receive a notification signal S2, where the notification signal S2 is related to the sense signal S1. For example, if the second antenna element 250 is arranged parallel to a finger of a user, the second antenna element 250 may detect a touch event related to the finger, and the first antenna element 240 may transmit the relative information of the touch event outwardly. Thus, an external device (not shown) can obtain the details of the touch event by analyzing the notification signal S2.

In some embodiments, the wearable device 200 further includes a third antenna element 260. For example, the third antenna element 260 may cover an NFC (Near Field Communication) frequency band and a WPT (Wireless Power Transfer) frequency band. Specifically, the third antenna element 260 includes a radiation coil 265. The radiation coil 265 may be disposed in the wearable element 220. For example, the radiation coil 265 may have both NFC and WPT functions, and the dual functions may be mainly implemented based on a sharing-coil design. In some embodiments, the radiation coil 265 is configured to receive a WPT signal and to transmit or receive an NFC signal. Since the wearable device 200 uses more antenna elements or more antenna arrays, it can also provide the functions of beamforming or beam switching. It should be understood that the third antenna element 260 is an optional element, which is removable in other embodiments.

In alternative embodiments, the third antenna element 260 includes one or more electrode pads for HBC (Human Body Communication). In an HBC system, the electrode pads are usually designed as metal surfaces in contact with the skin, so as to effectively transmit and receive communication signals with the human body as the medium, such as the aforementioned notification signal S2. The aforementioned electrode pads may be by materials with good electrical conductivity and biocompatibility, such as metal materials (e.g., copper or silver), carbon materials, or biocompatible coats, etc. The specific structure of the electrode pads may be different for various applications, including different shapes, different sizes, and different arrangements. In some embodiments, the third antenna element 260 includes a first radiation metal piece 275A and a second radiation metal piece 275B. The first radiation metal piece 275A and the second radiation metal piece 275B may be disposed in the wearable element 220. The SIP IC 230 may be positioned between the first radiation metal piece 275A and the second radiation metal piece 275B. For example, the first radiation metal piece 275A may be considered as a positive terminal of the electrode pads, and the second radiation metal piece 275B may be considered as a negative terminal of the electrode pads, but they are not limited thereto. Other features of the wearable device 200 of FIG. 2 are similar to those of the wearable device 100 of FIG. 1. Therefore, the two embodiments can achieve similar levels of performance.

Figure 4:
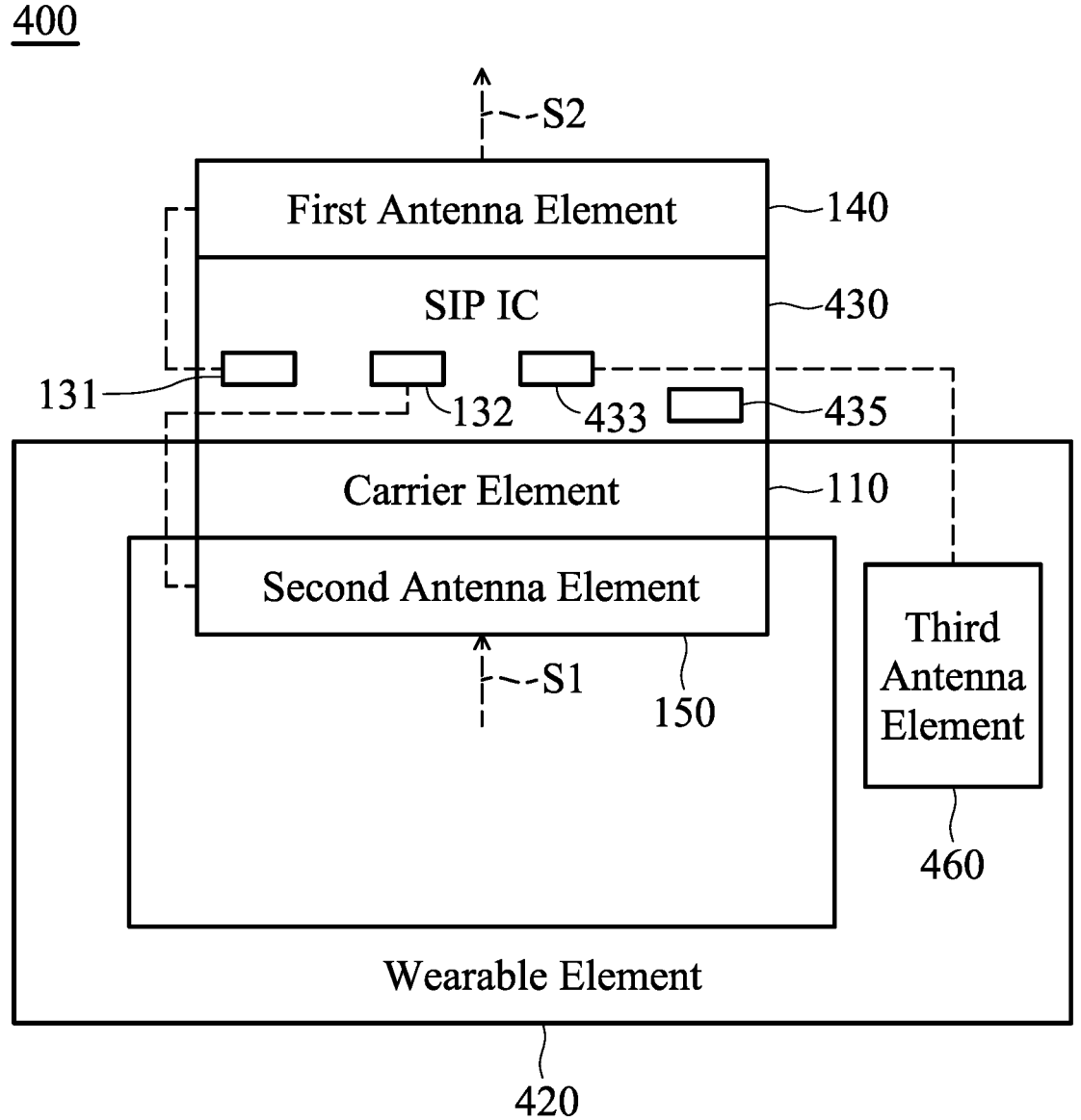
FIG. 4 is a diagram of a wearable device according to an embodiment of the invention.

FIG. 4 is a diagram of a wearable device 400 according to an embodiment of the invention. FIG. 4 is similar to FIG. 1. In the embodiment of FIG. 4, the wearable device 400 further includes a third antenna element 460, and an SIP IC 430 of the wearable device 400 further includes a third transceiver 433 and a processor 435. The third antenna element 460 is coupled to the third transceiver 433. The third antenna element 460 is integrated with a wearable element 420 of the wearable device 400. For example, the wearable element 420 may be implemented with a nonconductive ring-shaped element, and the third antenna element 460 may be embedded in the wearable element 420. In addition, the second antenna element 150 can receive a sense signal S1, the processor 435 can generate a notification signal S2 according to the sense signal S1, and the first antenna element 140 can transmit or receive the notification signal S2. Other features of the wearable device 400 of FIG. 4 are similar to those of the wearable device 100 of FIG. 1. Therefore, the two embodiments can achieve levels of performance.

FIG. 5 is a flowchart of a communication method according to an embodiment of the invention. To begin, in step S510, a wearable device is provided. The wearable device includes a carrier element, a wearable element, a SIP IC, a first antenna element, and a second antenna element. The wearable element is connected to the carrier element. The SIP IC includes a first transceiver and a second transceiver. The SIP IC is disposed on the carrier element. In step S520, the first antenna element is coupled to the first transceiver. In step S530, the first antenna element is integrated with the SIP IC. In step S540, the second antenna element is coupled to the second transceiver. Finally, in step S550, the second antenna element is integrated with the carrier element. It should be understood that these steps are not required to be performed in order, and every feature of the embodiments of FIGS. 1 to 4 may be applied to the communication method of FIG. 5.

The invention proposes a novel wearable device and a novel communication method thereof. In comparison to the conventional design, the invention has at least the advantages of improving the overall communication quality and minimizing the whole device size. Therefore, the invention is suitable for application in a variety of devices.

It should be noted that the above element parameters are not limitations of the invention. A designer can fine-tune these setting values according to different requirements. The wearable device and the communication method of the invention are not limited to the configurations of FIGS. 1-5. The invention may include any one or more features of any one or more embodiments of FIGS. 1-5. In other words, not all of the features displayed in the figures should be implemented in the wearable device and the communication method of the invention.

The method of the invention, or certain aspects or portions thereof, may take the form of program code (i.e., executable instructions) embodied in tangible media, such as diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A wearable device, comprising:
    a carrier element;
    a wearable element, connected to the carrier element;
    a SIP (System-In-Package) IC (Integrated Circuit), comprising a first transceiver, a second transceiver, and a third transceiver, wherein the SIP IC is disposed on the carrier element;
    a first antenna element, coupled to the first transceiver, wherein the first antenna element is integrated with the SIP IC;
    a second antenna element, coupled to the second transceiver, wherein the second antenna element is integrated with the carrier element; and
    a third antenna element, coupled to the third transceiver, wherein the third antenna element is integrated with the wearable element;
    wherein the third antenna element comprises a first radiation metal piece and a second radiation metal piece, and the SIP IC is positioned between the first radiation metal piece and the second radiation metal piece;
    wherein the first antenna element comprises an antenna array disposed on a top of the SIP IC; and
    wherein the antenna array is in contact with the SIP IC.

2. The wearable device as claimed in claim 1, wherein the wearable device is a smart ring with a communication function.

3. The wearable device as claimed in claim 1, wherein the carrier element is a ring platform element.

4. The wearable device as claimed in claim 1, wherein the carrier element is made of a metal material.

5. The wearable device as claimed in claim 1, wherein the wearable element is a ring support element.

6. The wearable device as claimed in claim 1, wherein the wearable element is made of a metal material or a non-metal material.

7. The wearable device as claimed in claim 1, wherein the SIP IC is implemented with a multilayer circuit board.

8. The wearable device as claimed in claim 1, wherein the first antenna element covers a first frequency band, and the first frequency band is from 60 GHz to 500 GHz.

9. The wearable device as claimed in claim 1, wherein the second antenna element covers a second frequency band, and the second frequency band is from 300 GHz to 500 GHz.

10. The wearable device as claimed in claim 9, wherein the second antenna element comprises:
    a radar waveguide array, formed in the carrier element.

11. The wearable device as claimed in claim 10, wherein the radar waveguide array comprises a plurality of waveguides parallel with each other.

12. The wearable device as claimed in claim 11, wherein a distance between any two adjacent waveguides is from 0.5 to 0.8 wavelength of the second frequency band.

13. The wearable device as claimed in claim 1, wherein the SIP IC further comprises a processor.

14. The wearable device as claimed in claim 13, wherein the second antenna element receives a sense signal, the processor generates a notification signal according to the sense signal, and the first antenna element transmits the notification signal outwardly.

15. The wearable device as claimed in claim 1, wherein the third antenna element covers an NFC (Near Field Communication) frequency band.

16. The wearable device as claimed in claim 1, wherein the third antenna element comprises:
    a radiation coil, disposed in the wearable element.

17. The wearable device as claimed in claim 1, wherein the antenna array comprises a plurality of antenna units, and the antenna units are arranged to form a square shape.

18. The wearable device as claimed in claim 17, wherein a total number of the antenna units is a perfect square number.

19. A communication method, comprising the steps of:
    providing a wearable device, wherein the wearable device comprises a carrier element, a wearable element, a SIP IC, a first antenna element, a second antenna element, and a third antenna element, wherein the wearable element is connected to the carrier element, wherein the SIP IC comprises a first transceiver, a second transceiver, and a third transceiver, and wherein the SIP IC is disposed on the carrier element;
    coupling the first antenna element to the first transceiver;
    integrating the first antenna element with the SIP IC;
    coupling the second antenna element to the second transceiver;
    integrating the second antenna element with the carrier element;
    coupling the third antenna element to the third transceiver; and
    integrating the third antenna element with the wearable element;

wherein the third antenna element comprises a first radiation metal piece and a second radiation metal piece, and the SIP IC is positioned between the first radiation metal piece and the second radiation metal piece;

wherein the first antenna element comprises an antenna array disposed on a top of the SIP IC; and wherein the antenna array is in contact with the SIP IC.

* * * * *